United States Patent
Ichikawa et al.

(10) Patent No.: US 6,764,742 B2
(45) Date of Patent: Jul. 20, 2004

(54) HONEYCOMB STRUCTURE BODY AND PRODUCTION METHOD THEREOF

(75) Inventors: Shuichi Ichikawa, Handa (JP); Takahiro Tomita, Ogaki (JP); Shinji Kawasaki, Nagoya (JP); Hiroaki Sakai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/240,322

(22) PCT Filed: Jan. 28, 2002

(86) PCT No.: PCT/JP02/00604

§ 371 (c)(1),
(2), (4) Date: Oct. 1, 2002

(87) PCT Pub. No.: WO02/062726

PCT Pub. Date: Aug. 15, 2002

(65) Prior Publication Data

US 2003/0108458 A1 Jun. 12, 2003

(51) Int. Cl.[7] .................................................. B32B 3/12
(52) U.S. Cl. ...................... 428/116; 428/34.4; 428/188; 422/177; 422/180; 422/222; 55/523; 264/628; 264/630; 264/639; 264/662; 264/669; 264/670
(58) Field of Search .................... 428/116–118, 34.1, 428/34.4, 188; 422/168, 177, 180, 222; 55/522, 523; 264/603, 628, 629, 630, 638, 639, 653, 662, 660, 669, 670

(56) References Cited

U.S. PATENT DOCUMENTS 5,114,882 A * 5/1992 Sugiyama et al.
5,634,952 A * 6/1997 Kasai et al.
2002/0180117 A1 * 12/2002 Yamamoto et al.

FOREIGN PATENT DOCUMENTS

| JP | A 61-26550 | 2/1986 |
|---|---|---|
| JP | B2 61-13845 | 4/1986 |
| JP | B2 61-13846 | 4/1986 |
| JP | A 61-97165 | 5/1986 |
| JP | A 2-6371 | 1/1990 |
| JP | A 6-182228 | 7/1994 |
| JP | A 8-165171 | 6/1996 |
| JP | A 9-202671 | 8/1997 |
| JP | A 10-29866 | 2/1998 |
| JP | A 11-253722 | 9/1999 |
| JP | A 2001-64084 | 3/2001 |
| JP | A 2001-199777 | 7/2001 |

OTHER PUBLICATIONS

Machine Translation JP 11–253722.*
Machine Translation JP 09–202671.*
Machine Translation JP 2001–199777.*

* cited by examiner

Primary Examiner—Deborah Jones
Assistant Examiner—Wendy Boss
(74) Attorney, Agent, or Firm—Oliff & Berridge, PLC

(57) ABSTRACT

A honeycomb structure body which has a number of passages partitioned with partition walls and penetrating along the axial direction. A porous honeycomb structure body which contains refractory grains as filler, one or more elements selected from the group consisting of the rare earth elements, alkaline earth elements, Al, and Si, and the crystal containing one or more kinds of these elements. The present honeycomb structure body contains refractory grains such as silicon carbide grains and the like, but it can be produced at a relatively low firing temperature at a low price, it is sufficiently porous and high in specific surface area, and it can be used as a filter for purifying automobile exhaust gas, a catalyst carrier, and the like under the high SV conditions.

28 Claims, No Drawings

HONEYCOMB STRUCTURE BODY AND PRODUCTION METHOD THEREOF

TECHNICAL FIELD

The present invention relates to honeycomb structure bodies used in filters for purifying automobile exhaust gas, catalyst carriers, and the like.

BACKGROUND ART

Porous honeycomb structure bodies are widely used as filters for collecting and removing particulate materials contained in such particulate dust containing fluid as exhaust gas discharged from diesel engines, or used as catalyst carriers for supporting catalytic components which purify harmful substances contained in the exhaust gas. In addition, it is well known that such a refractory granular powder as composed of the silicon carbide (SiC) grains and the like is used as a material composing such a honeycomb structure body.

As a specific related technique, for example, in JP-A-6-182228, there is disclosed a catalyst carrier of porous silicon carbide which has a honeycomb structure, obtained by using as the starting material a silicon carbide powder having a prescribed specific surface area and a prescribed impurity content, and by molding the material into a desired shape and drying, and subsequently firing in the temperature range of 1600 to 2200° C.

On the other hand, in JP-A-61-26550, there is disclosed a production method of a refractory substance containing a vitrifiable raw material which method is characterized in that a vitrifiable raw material is added to an easily oxidizable raw material or a refractory composite containing easily oxidizable raw materials, and the mixture obtained is mixed with a bonding material, and this mixture is kneaded and molded, and the molded body obtained is fired without crusible in a furnace having a nonoxidizing atmosphere, while in JP-A-8-165171, there is disclosed a silicon carbide molded body which is molded by adding an organic binder and inorganic binders based on clay minerals, glass, and lithium silicate to the silicon carbide powder.

In addition, in JP-A-6-182228 described above, there is also introduced, as a prior production method of sintered body based on porous silicon carbide, a production method in which a bonding material such as a glass-based flux or a clay material is added to silicon carbide grains working as filler, the mixture thus obtained is molded, and subsequently fired and compacted at the temperature at which the bonding material is melted.

Furthermore, in JP-B-61-13845 and JP-B-61-13846, there are disclosed the suitable average grain size of the refractory granular powder, the grain size distribution of the refractory granular powder, the porosity ratio of a tubular body, the average pore diameter of a tubular body, the pore volume of a tubular body, and the partition wall thickness of a tubular body, and the like, with respect to a high temperature ceramic filter formed in a porous, bottomed tubular shape in which the refractory granular powder, composed of silica sand, ceramic pulverized substances, metal oxide such as $Al_2O_3$, $TiO_2$, $ZrO_2$, and the like, silicon carbide, nitrides, borides, or other refractory materials and the like, is graded in grain size to a prescribed grain size, and used as mixed with a refractory bonding material such as liquid glass, flit, glaze, and the like.

Furthermore, in JP-A-10-29866, JP-A-2-6371, and JP-A-61-97165, there are disclosed the methods, compositions, and the like for silicon carbide based brick bonded with sialon which is an oxynitride of Si and Al.

As for a sintered form (necking) based on the recrystallization reaction of silicon carbide powder itself, disclosed in JP-A-6-182228 as described above, the silicon carbide component is evaporated from the surfaces of the silicon carbide grains, the evaporated component is condensed in the contact portions (neck portions) between grains, and thus the neck portions grow to yield the bonded state; in this connection, there is a problem that the cost increase is caused by the very high temperature required for the silicon carbide evaporation and the firing process yield is degraded owing to the high temperature firing needed for a material of high thermal expansion coefficient.

On the other hand, a technique for bonding the raw material of silicon carbide powder with glass material, disclosed in JP-A-61-26550 and JP-A-6-182228, requires a temperature between 1000 and 1400° C. which is low for the firing temperature, but it is very difficult to obtain porous substances because the bonding material undergoes once a melted state.

Furthermore, the filters disclosed in JP-B-61-13845 and JP-B-61-13846 are porous, but are of the bottomed tubular shape with partition walls of thickness as thick as 5 to 20 mm, and hence they cannot be applied under the high SV (spatial velocity) condition for the filters for purifying automobile exhaust gas.

In addition, furthermore, the silicon carbide based bricks bonded with sialon, as disclosed in JP-A-10-29866, JP-A-2-6371, and JP-A-61-97165, are used for a liner for furnaces and shelf boards, and the porosity is as small as 20% or below, but is absolutely inappropriate for being used as filters for purifying automobile exhaust gas in view of the pressure loss.

The present invention has been made in view of the above described circumstances, and takes as its object the provision of a honeycomb structure body and the production method thereof which honeycomb structure body contains such refractory grains as the silicon carbide grains, but can be produced at a relatively low firing temperature and at a low cost, is sufficiently porous, has a high specific surface area, and can be used suitably even under the high SV condition as a filter for purifying automobile exhaust gas, a catalyst carrier, or the like, by being subjected to plugging and the like.

DISCLOSURE OF THE INVENTION

According to the present invention, there is provided a honeycomb structure body which has a large number of passages penetrating along the axial direction and being partitioned with partition walls, and which is characterized in that the honeycomb structure body contains refractory grains as filler and one or more kinds of elements selected from the group consisting of the rare earth elements, the alkaline earth elements, Al, and Si; and the honeycomb structure body has a crystal containing at least one or more than one kinds of these elements, and is porous.

In addition, according to the present invention, there is provided a production method of a honeycomb structure body which method is characterized in that a puddle is obtained by adding one or more kinds of raw materials containing one or more kinds of elements selected from the group consisting of the rare earth elements, the alkaline earth elements, Al, and Si as well as an organic binder to a refractory granular raw material, and by successively mixing and kneading; and the obtained puddle is molded into a honeycomb shape, and the obtained molded body is calcined to remove the organic binder and subsequently fired for finishing.

BEST MODE FOR CARRYING OUT THE INVENTION

The honeycomb structure body of the present invention is an article in which refractory grains are bonded to each other by applying the mechanism of melt precipitation, in contrast to the production method described in JP-A-6-182228 in which the mechanism of evaporation condensation is employed in the sintering mechanism. In the melting precipitation mechanism, proper sintering aids are selected, added to and mixed with a refractory granular powder, which is a filler, and fired, when the aids are allowed to react with the refractory grains, and at that time the surfaces of the grains are melted to form liquid phase. The melted component, as it is in the liquid phase while containing the added aid components, moves to the neck portions low in energy state to be precipitated, and thus the substance transferred to the neck portions bonds the grains to each other.

As for the liquid phase, in the firing process, in some cases, the aids react mutually to form the liquid phase at the beginning, and the liquid phase reacts with the refractory grains, while in some other cases the reaction between the aids and the refractory grains leads to the formation of the liquid phase. In general, a state of liquid phase easily makes the refractory grains get wet, and hence makes the reaction occur easily, so that it is preferable to select a combination of the aids which combination has the eutectic point lower than the firing temperature. Specifically, as the aid, there is used one or more kinds of raw materials (hereinafter referred to as a raw material containing rare earth elements and the like) containing one or more kinds of elements selected from the group consisting of the rare earth elements (Y, La, Ce, Yb, and the like), the alkaline earth elements (Mg, Ca, Sr, Ba, and the like), Al, and Si. Among the above elements, Si is particularly effective in decreasing the melting point of an aid.

One or more kinds of elements, selected from the group consisting of the rare earth elements, the alkaline earth elements, Al, and Si, contained in the honeycomb structure body of the present invention are the elements included in the raw materials added as aids, as described above, during production, and are mainly present as contained in the crystals precipitated in the neck portions. Furthermore, the refractory granular powder may be added with the raw materials containing B and/or C as the elements promoting the mass transfer on the grain surface, for example, a compound $B_4C$ composed of these elements, and in this case, accordingly there are contained B and/or C in the obtained honeycomb structure body.

In addition, the honeycomb structure body of the present invention has the crystal containing one or more above described elements contained in the raw materials added as the aids, which in other words means that the crystal has been precipitated from the liquid phase. As far as the liquid phase is employed, as described above, for bonding the refractory grains working as filler, when the crystal is not precipitated from the liquid phase, the liquid phase portions remain as glass in the sintered body. On the other hand, when the glass phase becomes the main phase in the neck portions, the strength, corrosion resistance, and heat resistance of the neck portions associated with the refractory grains do not reach the sufficient values, and hence the characteristics of the honeycomb structure body itself are degraded. Accordingly, the crystal is required to be precipitated from the liquid phase.

As described above, as for the honeycomb structure body of the present invention, since the refractory grains are bonded by taking advantage of the reaction and the liquid phase thereby generated, in contrast to the evaporation of the refractory granular powder itself as in the recrystallization method, a very high temperature is not required for firing, and accordingly the production cost can be suppressed and the process yield can be improved. In addition, in the present invention, there is concerned neither a bottomed tubular body with thick wall as disclosed in JP-B-61-13845 and JP-B-61-13846, nor brick as disclosed in JP-A-10-29866, JP-A-2-6371, and JP-A-61-97165, but there is concerned a porous honeycomb structure body, and hence it can be used as a filter for purifying automobile exhaust gas and a catalyst carrier under the high SV condition.

The honeycomb structure body of the present invention preferably has a structure, as its fine structure, in which the refractory grains are bonded through crystal, in a state of grain where the grain shape in the granular raw material is maintained. In addition, when the honeycomb structure body of the present invention is used as a filter for collecting and removing the particulate materials in the particulate dust containing fluid, its porosity is preferably made to fall within the range from 30 to 90%. When the porosity of the honeycomb structure body is smaller than 30%, the filtration speed becomes insufficient, while it exceeds 90%, the strength as a structure body becomes insufficient. Furthermore, when the honeycomb structure of the present invention is used in an application involving a possible adverse effect of the pressure loss in a filter for purifying automobile exhaust gas and the like, it is preferable to set the porosity to be 40% or above.

Similarly, when the honeycomb structure body of the present invention is used as a filter, the average pore size of the honeycomb structure body is preferably determined according to the object to be filtered. For example, when it is used as a diesel particulate filter (DPF) for collecting and removing the particulate materials contained in the exhaust gas discharged from a diesel engine, the average pore size is preferably set to fall within the range from 2 to 50 $\mu$m. When the average pore size is smaller than 2 $\mu$m, the pressure loss is remarkably increased even by a small amount of deposition of the particulate materials, while on the contrary, when the average pore size exceeds 50 $\mu$m, the particulate materials passes through without being affected and hence it is not preferable.

The thickness of the partition walls partitioning the passages (cells) of the honeycomb structure body is preferably made to be 4 mil or above (102 $\mu$m or above). When the partition wall thickness is smaller than 4 mil (102 $\mu$m), it becomes difficult to maintain a sufficient strength as a structure body. Incidentally, the strength is intimately related to the porosity, and in the case of the honeycomb structure body of the present invention, it has been found preferable that when the partition wall thickness is set so that the partition wall thickness and the porosity satisfy the following relation, the required strength can be obtained.

$$\text{Partition wall thickness } (\mu m) \geq \text{porosity } (\%) \times 4$$

Furthermore, it is more preferable to set the partition wall thickness so that the partition wall thickness and the porosity satisfy the following relation, since a sufficient strength can be obtained.

Partition wall thickness ($\mu m$)≧porosity (%)×5

On the other hand, when the honeycomb structure body of the present invention is used as a filter such as a DPF and the like, the partition wall thickness is preferably set to be 50 mil or below (1270 $\mu m$ or below). This is because there occurs an apprehension that the filtration speed will become insufficient and the pressure loss will increase when the partition wall thickness exceeds 50 mil (1270 $\mu m$). In this connection, there is also an intimate relation between the partition wall thickness and the porosity, and the above described problem can be circumvented by setting the partition wall thickness so that the partition wall thickness and the porosity satisfy the following relation.

Partition wall thickness ($\mu m$)≧porosity (%)×20

The cell density of a honeycomb structure body is preferably set to fall within the range from 5 to 1000 cells/square inch (from 0.7 to 155 cells/cm$^2$). When the cell density is smaller than 5 cells/square inch (0.7 cell/cm$^2$), the strength becomes insufficient as a honeycomb structure body, and in addition the filtration area also becomes insufficient when the honeycomb structure body is used as a filter. On the contrary, it is not preferable for the cell density to exceed 1000 cells/square inch (155 cells/cm$^2$), because this causes a pressure loss.

Now, description will be made of the production method of the honeycomb structure body of the present invention. When the honeycomb structure body of the present invention is produced, at the beginning a puddle for molding is obtained by adding a raw material containing the rare earth metals and the like and an organic binder to a refractory granular raw material, and by successively mixing and kneading these materials.

As for the type of the refractory granular powder, there is no particular restrictions. There are preferably used granular powders based on oxide such as $Al_2O_3$, $ZrO_2$, and $Y_2O_3$, carbide such as SiC, nitride such as $Si_3N_4$ and AlN, and in addition granular powder based on mullite and the like. In particular, SiC and the like are high in heat resistance and hence preferably used for DPF's and the like which are frequently exposed to high temperatures during combustion disposal of deposited particulate materials.

The average grain size of the refractory granular powder is preferably twice to four times the average pore size of the honeycomb structure body (sintered body) finally obtained by the present production method. Even after the firing, the honeycomb structure body obtained by the present production method maintains by and large the grain shape and grain size in the refractory granular raw material, owing to the relatively low firing temperature. Accordingly, when the above mentioned ratio is smaller than twice, the grain size is too small for the desired pore size, and as a result, small groups of refractory grains are precipitated in an elongated manner to form crystals being bonded long and large pores are formed therefrom; thus, it is difficult to obtain a strength sufficiently high for maintaining such a structure body with thin partition walls as a honeycomb structure body.

In addition, talking about, for example, the refractory granular powder composed of SiC powder, the recrystallized SiC conventionally applied to porous honeycomb structure bodies requires, owing to the reaction mechanism involved, the grain size of the filler raw material nearly identical to the desired pore size. On the contrary, in the case of the SIC grains bonded by precipitated crystals as in the case of the honeycomb structure body of the present invention, the grain size is allowed to be twice or more the desired pore size. Accordingly, as compared to the recrystallized SiC material, a more coarse SiC material can be used when intending to obtain the same pore size as that in the case of the recrystallized SiC material, namely, a more inexpensive raw material can be used, resulting in offering major cost benefits.

On the other hand, when the above mentioned ratio exceeds four times, the grain size of the refractory granular powder used is too large for the desired pore size, and hence it is difficult to obtain the desired pores formed in the voids between the refractory grains even when the refractory grains are charged compactly at the molding step; furthermore, the ratio exceeding four times is not preferable from the viewpoint of filters, since the decrease in porosity is induced.

The raw material containing rare earth elements and the like reacts with refractory grains during firing, or the grains of the raw material react with each other, to produce the liquid phase; the liquid phase matter surrounds the refractory grains and plays the role of bonding the refractory grains to each other, and hence the proper addition amount of the raw material containing rare earth elements and the like is intimately dependent on the surface area of the refractory granular powder. In this case, as for the surface area of the refractory granular powder, it is generally appropriate to adopt the geometrical surface area $S=4\pi r^2$ (r is the average grain size of the refractory granular powder) obtained by assuming a refractory grain as a sphere, rather than the so-called BET specific surface area, since the discussion is developed on the liquid phase matter surrounding the refractory grains and bonding the grains to each other, although the choice may depend on the grain shape and the like. The use of the geometrical surface area $S=4\pi r^2$ allows to easily calculate "the content W of the raw material containing rare earth elements and the like per the unit surface area of the refractory grain" on the basis of the following expression, $$W\{(4/3\pi r^3 \times \rho)/(\text{the weight ratio of the refractory granular powder})\} \times \{(\text{the weight ratio of the raw material containing rare earth elements and the like})/(4\pi r^2)\},$$

(where r denotes the average grain size of the refractory granular powder, and $\rho$ denotes the specific gravity of the refractory granular powder).

In the production method of the present invention, the addition amount of the raw material containing rare earth elements and the like is preferably set so that "the content W of the raw material containing rare earth elements and the like per the unit surface area of the refractory grain" falls within the range from 3 to 30 g/m$^2$. When W is smaller than 3 g/m$^2$, the amount of the bonding material is insufficient, and hence it is difficult to obtain such strength that can maintain a structure body with thin walls such as a honeycomb structure body. On the other hand, when W exceeds 30 g/m$^2$, the liquid phase matter is produced superfluously to properly bond the refractory grains to each other, and hence there occur simultaneously such adverse effects as the porosity decrease, the average pore size reduction, and the like, although the strength is improved.

The average grain size of the raw material containing rare earth elements and the like is preferably smaller than or equal to the 50% of the average grain size of the refractory granular powder as the filler. The raw material containing the rare earth elements and the like produces the liquid phase in firing, and the produced liquid phase matter moves in an aggregated manner to surround the refractory grains. Thus, when its grain size exceeds 50% of the grain size of the refractory granular powder, the spatial volume occupied during molding by the grains of the raw material containing the rare earth elements and the like is converted to a large volume of persisting voids, causing the strength reduction, the filtration efficiency degradation (filtration leakage) when the honeycomb structure body is used as a filter, and the like.

In addition, in general, in the extrusion molding of the honeycomb structure body, a smooth extrusion can be achieved by mixing two or more types of raw material powders different to some extent from each other in grain size. From this viewpoint, the average grain size of the raw material containing the rare earth elements and the like is preferably smaller than or equal to 30% of the average grain size of the refractory granular powder working as a filler. As for the raw material form of the raw material containing the rare earth elements and the like, there are usually used oxides, and there can be used, according to need, inorganic salts such as nitrates and chlorides, nitrides, metals, and the like. When there are used those compounds which contain two or more kinds of the necessary elements, such as clay minerals, there is offered the benefits that the productivity is improved through the decreased cost, improved moldability, and the like.

For the purpose of smooth extrusion molding into the honeycomb shape of the puddle which is formed by using a refractory granular powder as filler, and by blending a raw material containing the rare earth elements and the like, and according to need, a pore forming agent and the like, it is preferable to add 2 wt % or more of one or more kinds of organic binders as a super addition to the total amount of the main raw material (the refractory granular raw material and the raw material containing the rare earth elements and the like) as molding aid. Incidentally, the addition of the amount exceeding 30 wt % is not preferable because it leads to a superfluously high porosity and an insufficient strength after calcination.

Furthermore, for the case of extrusion molding of the honeycomb structure body with wall thickness of 20 mil (508 $\mu$m) or below, it is preferable to add an organic binder within the range from 4 to 20 wt %. When the addition amount is smaller than 4 wt %, it is difficult to extrude the body into such a thin wall body as described above. On the contrary, when the addition amount exceeds 20 wt %, it becomes difficult for the extrusion molded body to maintain its shape after extrusion.

When a honeycomb structure body is used as a filter, a pore forming agent may be added to the puddle in blending for the purpose of improving the porosity. The addition amount of the pore forming agent is preferably 30 wt % or below as a super addition to the total amount of the main raw material (the refractory granular raw material and the raw material containing the rare earth elements and the like). When the addition amount exceeds 30 wt %, the porosity becomes high in excess, leading to an insufficient strength. The pore forming agent leaves the pores formed after it is burn out, and hence it is preferable that the average grain size of the pore forming agent falls within the range from 25 to 100% of the average pore size intended to be obtained after firing. As the pore forming agents used, there can be listed, for example, graphite, wheat flour, starch, phenol resin, poly(methyl methacrylate), polyethylene, poly (ethylene terephthalate), and the like. The pore forming agents may be used each alone or in combination of two or more thereof.

In addition, in the production method of the present invention, it is required that the crystal be precipitated from the liquid phase as described above, and hence quadrivalent or higher elements (Zr, Ta, Ti, P, and the like) may be added to the refractory granular raw material as nucleation agents for the purpose of promoting the crystallization. Furthermore, the refractory granular raw material may be added with the raw materials containing B and/or C which are the elements promoting mass transfer on the grain surface.

The above described raw materials are mixed and kneaded according to the usual methods to form the puddle, and the thus obtained puddle is molded into the desired honeycomb shape by extrusion molding. Then the molded body is calcined to remove the organic binder contained in the molded body (degreasing), and subsequently fired for finishing. The calcination is preferably performed at a temperature lower than the temperature at which the raw material containing the rare earth elements is melted. Specifically, the molded body may be maintained at 150 to 700° C. for a while, and may be calcined by slowing down the temperature increasing rate to 50° C./hr or below in a predetermined temperature range.

As for the method in which the temperature is maintained at a prescribed temperature for a while, either the temperature maintenance at one level of temperature or that at a plurality of levels of temperatures may be valid, depending on the type and amount of the used organic binder, and in addition, when the maintenance at the plurality of levels of temperatures is adopted, the maintenance times at the individual levels of temperatures may be either the same or different from each other. In addition, as for the method in which the temperature increasing rate is slowed down, the rate may be slowed down either in one temperature interval or in a plurality of temperature intervals, and moreover, as for the plurality of temperature intervals, the intervals may be the same or different from each other.

As for the calcination atmosphere, the atmosphere may be oxidizing. When a large amount of an organic binder is contained in the molded body, however, sometimes the temperature of the molded body is abruptly increased while calcining by the intensive burning of the organic binder in the presence of oxide, and accordingly it is a preferable technique to suppress the abnormal temperature increase of the molded body by calcining in an inert atmosphere of $N_2$, Ar, and the like. The suppression of the abnormal temperature increase is an important control involved when a raw material large in thermal expansion coefficient (weak to impact) is used. When there is added an organic binder, for example, of 20 wt % or more (as a super addition) in relation to the main raw materials, it is preferable to calcine in the atmosphere of an inert gas.

The calcination and the following firing may be carried out as separate processes in one and the same furnace or in different furnaces, and in addition may be carried out as a continuous process in one furnace. The former way of processing is preferable when the calcination and the firing are respectively performed in different atmospheres, while the latter way of processing is also preferable from the standpoints of the total firing time and the operation cost of the furnace.

As for the temperature of the firing, which is varied according to the used raw material containing the rare earth elements, it is preferable to perform the firing usually within the range from 1500 to 2000° C. When the temperature at which the firing is performed is lower than 1500° C., the liquid phase is not fully produced, and hence the refractory grains are not firmly bonded to each other. On the contrary, when it exceeds 1600° C., the viscosity of the melted component becomes too low so that the melted component is not uniformly distributed in such a way that it is concentrated either near the fired body surface, in the lower portion of the fired body, or in the like manners, and hence it is not preferable that the temperature of the firing exceeds 1600° C. Incidentally, in order to promote crystallization, it is preferable to arrange in the firing, subsequently to the maintenance at a maximum temperature, the annealing process for crystallization which process allows the maintenance at 1500° C. or below.

In addition, it is preferable to properly select the atmosphere for the firing, according to the type of the refractory granular powder; for example, when the refractory granular powder has resistance to oxidation, it is possible to perform the firing in the oxidizing atmosphere, whereas it is preferable to choose the nonoxidizing atmosphere such as $N_2$ and Ar at least for the temperature range equal to or above the temperature at which the oxidation starts to take place, in the case where the refractory granular powder has an adverse possibility of being oxidized at high temperatures as in the carbide granular powders of SiC, and the like, the nitride granular powders represented by $Si_3N_4$ and AlN, and the like. Incidentally, when the firing is performed in the $N_2$ atmosphere, the conversion to nitrides or oxynitrides occurs in the crystal phase in the bonding material, which conversion sometimes results in the improved characteristics with respect to the strength and thermal conductivity compared to the case where the conversion to oxides occurs in the crystal phase. Accordingly, it is preferable to choose the firing atmosphere according to the purpose.

More detailed description will be made below of the present invention on the basis of the examples, but the present invention is not limited to these examples.

EXAMPLES 1 TO 7

The SiC raw material powders having the average grain sizes as shown in Table 1, the $Y_2O_3$ powder with the average grain size of 2 μm, the $Al_2O_3$ powder with the average grain size of 0.5 μm, the Mg powder with the average grain size of 3 μm, the $SiO_2$ powder with the average grain size of 4 μm, and the $B_4C$ powder were blended so as to give the compositions shown in Table 1. To 100 parts by weight of each of the powders having the above described compositions, 6 parts by weight of methyl cellulose as an organic binder, 2.5 parts by weight of a surfactant, and 24 parts by weight of water were added, and the mixture thus obtained was mixed and kneaded homogeneously, to obtain the puddle for molding. The obtained puddle was molded by using an extrusion molding machine into a honeycomb shape in which the outside diameter is 45 mm, the length is 120 mm, the thickness of the partition wall is 0.43 mm, and the cell density is 100 cells/square inch (16 cells/cm$^2$). The honeycomb molded body was calcined at 550° C. for 3 hours in an oxidizing atmosphere for the purpose of degreasing. Subsequently, the honeycomb molded body was fired in the Ar atmosphere at the firing temperature specified in Table 1 for 2 hours, and thus a porous silicon carbide sintered body having honeycomb structure was produced. The sintered bodies thus obtained were subjected to the average pore size and porosity measurements using a mercury porosimeter, and further to the four-point bending strength measurement, the results obtained being listed in Table 1. In addition, the crystal phases were identified on the basis of X-ray diffraction, and it was confirmed that the crystal phases were composed of one phase consisting of SiC and the oxides added as the aids or composed of the compound thereof.

TABLE 1

| | Average grain size of SiC powder (μm) | Content of SiC powder (wt %) | Content of $Y_2O_3$ powder (wt %) | Content of MgO powder (wt %) | Content of $Al_2O_3$ powder (wt %) | Content of $SiO_2$ powder (wt %) | Content of $B_4C$ powder (wt %) | Firing temperature (° C.) | Average pore size (μm) | Porosity (%) | 4-point bending strength (MPa) |
|---|---|---|---|---|---|---|---|---|---|---|---|
| Example 1 | 32.6 | 90 | 5 | 0 | 0 | 0 | 5 | 2000 | 9.5 | 39.6 | 60 |
| Example 2 | 32.6 | 95 | 5 | 0 | 0 | 0 | 0 | 2000 | 10.0 | 42.0 | 52 |
| Example 3 | 32.6 | 90 | 0 | 0 | 5 | 0 | 5 | 2000 | 9.0 | 40.1 | 50 |
| Example 4 | 32.6 | 75 | 7 | 0 | 7 | 7 | 4 | 1800 | 10.2 | 45.0 | 48 |
| Example 5 | 32.6 | 75 | 0 | 7 | 7 | 7 | 4 | 1800 | 10.6 | 46.1 | 45 |
| Example 6 | 50.0 | 90 | 5 | 0 | 0 | 0 | 5 | 2000 | 13.3 | 44.0 | 55 |
| Example 7 | 50.0 | 75 | 7 | 0 | 7 | 7 | 4 | 1800 | 15.0 | 49.0 | 47 |

EXAMPLE 8

A silicon carbide sintered body having honeycomb structure was produced in a manner similar to that in Example 4, except that the powder blended so as to have the composition of Example 4 shown in Table 1 was added as a super addition with 1 wt % of the $ZrO_2$ powder. The sintered body thus obtained was subjected to the measurements of the average pore size, porosity, and four-point bending strength in a manner similar to that in Examples 1 to 7, the results obtained being shown in Table 2. In addition, according to the X-ray diffraction observation, it was found that the halo indicating the presence of a glass phase was reduced as compared to Example 4.

EXAMPLE 9

A silicon carbide sintered body having honeycomb structure was produced in a manner similar to that in Example 4, except that in the firing, the temperature was maintained at a highest temperature (1800° C.), and subsequently at 1400° C. for 3 hours for annealing. The sintered body thus obtained was subjected to the measurements of the average pore size, porosity, and four-point bending strength in a manner similar to that in Examples 1 to 7, the results obtained being shown in Table 2. In addition, according to the X-ray diffraction observation, it was found that the halo indicating the presence of a glass phase was reduced as compared to Example 4.

TABLE 2

| | Average pore size (μm) | Porosity (%) | 4-point bending strength (MPa) |
|---|---|---|---|
| Example 8 | 9.8 | 44.0 | 51 |
| Example 9 | 10.0 | 44.5 | 52 |

EXAMPLES 10 TO 12

The SiC raw material powders having the average grain sizes as shown in Table 3, the $Al_2O_3$ powder with the average grain size of 0.5 µm, the CaCO₃ powder with the average grain size of 0.5 µm, the SiO₂ powder with the average grain size of 4 µm were blended so as to give the compositions shown in the same table. To 100 parts by weight of each of the powders having the above described compositions, 6 parts by weight of methyl cellulose as an organic binder, 2.5 parts by weight of a surfactant, and 24 parts by weight of water were added, and the mixture thus obtained was mixed and kneaded homogeneously, to obtain the puddle for molding. The obtained puddle was molded into a honeycomb shape, in a manner similar to that in Examples 1 to 7 described above. The honeycomb molded body was calcined at 550° C. for 3 hours in an oxidizing atmosphere for the purpose of degreasing. Subsequently, the honeycomb molded body was fired in the $N_2$ atmosphere at the firing temperature specified in Table 3 for 2 hours, and thus a porous silicon carbide sintered body having honeycomb structure was produced. The sintered bodies thus obtained were subjected to the average pore size, porosity, and four-point bending strength measurements, in a manner similar to that in Examples 1 to 7, the results obtained being listed in Table 3. In addition, according to the identification of the crystal phases with X-ray diffraction, in addition to SiC, there were identified AlN in Example 10, $Si_3N_4$ and AlN in Example 11, and SiAlON in Example 12, respectively.

TABLE 3

| | Average grain size of SiC powder (µm) | Content of SiC powder (wt %) | Content of Al₂O₃ powder (wt %) | Content of CaCO₃ powder (wt %) | Content of SiO₂ powder (wt %) | Firing temperature (° C.) | Average pore size (µm) | Porosity (%) | 4-point bending strength (MPa) |
|---|---|---|---|---|---|---|---|---|---|
| Example 10 | 32.6 | 88 | 9 | 8 | — | 1800 | 10.0 | 50.0 | 20 |
| Example 11 | 32.6 | 60 | 10 | — | 30 | 1800 | 14.0 | 50.0 | 25 |
| Example 12 | 32.6 | 60 | 10 | — | 30 | 1600 | 13.0 | 52.0 | 24 |

INDUSTRIAL APPLICABILITY

As described above, the honeycomb structure body of the present invention contains refractory grains such as silicon carbide grains and the like, but it can be sintered at a relatively low firing temperature when it is produced. Thus, the production cost can be suppressed, the process yield is improved simultaneously, and the honeycomb structure body of the present invention can be provided at a low price. In addition, it is a porous honeycomb structure body, and accordingly can be suitably used as a filter for purifying automobile exhaust gas, a catalyst carrier, and the like under the high SV conditions.

What is claimed is:

1. A honeycomb structure body which has a large number of passages penetrating along the axial direction and being partitioned with partition walls, characterized in that the honeycomb structure body contains refractory grains as filler as well as one or more kinds of elements selected from the group consisting of rare earth elements, the alkaline earth elements, Al, and Si; and the honeycomb structure body has a crystal containing one or more kinds of these elements, and is porous, wherein the crystal is precipitated from the liquid phase of the refractory grains and the one or more kinds of elements contained in the raw material at a neck portion.

2. The honeycomb structure body according to claim 1, further containing at least one of B and C.

3. The honeycomb structure body according to claim 1, having a structure in which said refractory grains are, in a state maintaining the grain shape of the raw material, bonded to each other through said crystal.

4. The honeycomb structure body according to claim 1, wherein said refractory grains are the silicon carbide grains.

5. The honeycomb structure body according to claim 1, wherein used as a filter for collecting and removing the particulate materials contained in the particulate dust containing fluid.

6. The honeycomb structure body according to claim 1, having the porosity falling within the range from 30 to 90%.

7. The honeycomb structure body according to claim 1, having the average pore size falling within the range from 2 to 50 µm.

8. The honeycomb structure body according to claim 1, having the thickness of said partition wall falling within the range from 102 to 1270 µm.

9. The honeycomb structure body according to claim 1, wherein the thickness of said partition wall and the porosity of the honeycomb structure body satisfy the following relation:

Partition wall thickness (µm)≧porosity (%)×4.

10. The honeycomb structure body according to claim 1, wherein the thickness of said partition wall and the porosity of the honeycomb structure body satisfy the following relation:

Partition wall thickness (µm)≧porosity (%)×5.

11. The honeycomb structure body according to claim 1, wherein the thickness of said partition wall and the porosity of the honeycomb structure body satisfy the following relation:

Partition wall thickness (µm)≧(%)×20.

12. The honeycomb structure body according to claim 1, wherein the cell density is 0.7 to 155 cells/cm².

13. A production method of a honeycomb structure which has a large number of passages penetrating along the axial direction and being partitioned with partition walls, said honeycomb structure body containing refractory grains as filler as well as one or more kinds of elements selected from the group consisting of rare earth elements, alkaline earth elements, Al, and Si; and having a crystal containing one or more kinds of these elements, and being porous, characterized in that a puddle is obtained by adding one or more kinds of raw materials containing one or more kinds of elements selected from the group consisting of the rare earth elements, the alkaline earth elements, Al, and Si as well as an organic binder to a refractory granular raw material, and by successively mixing and kneading; and the obtained puddle is molded into a honeycomb shape, and the obtained molded body is calcined to remove the organic binder and subsequently fired for finishing, so that the crystal is precipitated from the liquid phase of the refractory grains and the one or more kinds of elements contained in the raw material at a neck portion.

14. The production method of a honeycomb structure body according to claim 13, wherein said refractory granular raw material is the silicon carbide granular raw material.

15. The production method of a honeycomb structure body according to claim 13, wherein the average grain size of said refractory granular raw material is twice to four times the average pore size of the honeycomb structure body finally obtained.

16. The production method of a honeycomb structure body according to claim 13, wherein the addition amount of said one or more kinds of raw materials containing one or more kinds of elements selected from the group consisting of the rare earth elements, the alkaline earth elements, Al, and Si is 3 to 30 g/m$^2$ in relation to the surface area of the refractory granular powder.

17. The production method of a honeycomb structure body according to claim 13, wherein the average grain size of said one or more kinds of raw materials containing one or more kinds of elements selected from the group consisting of the alkaline earth elements, Al, and Si is smaller than or equal to 50% of the average grain size of the refractory granular powder as the filler.

18. The production method of a honeycomb structure body according to claim 13, wherein there is added 2 to 30 wt % of said organic binder as a super addition to the total amount of said refractory granular raw material and one or more kinds of the raw materials containing one or more kinds of elements selected from the group consisting of the rare earth elements, the alkaline earth elements, Al, and Si.

19. The production method of a honeycomb structure body according to claim 13, wherein a pore forming agent is added, when said puddle is prepared, in the range of 30 wt % or below as a super addition to the total amount of the refractory granular raw material and one or more kinds of the raw materials containing one or more kinds of elements selected from the group consisting of the rare earth elements, the alkaline earth elements, Al, and Si.

20. The production method of a honeycomb structure body according to claim 13, wherein further a raw material containing at least one of B and C is added, when said puddle is prepared, to said refractory granular raw material.

21. The production method of a honeycomb structure body according to claim 13, wherein further quadrivalent or higher elements are added as nucleation agents, when said puddle is prepared, to said refractory granular raw material.

22. The production method of a honeycomb structure body according to claim 13, wherein the calcination of said molded body is performed at a temperature lower than the temperature at which said one or more kinds of the raw materials containing one or more kinds of elements selected from the group consisting of the rare earth elements, the alkaline earth elements, Al, and Si are melted.

23. The production method of a honeycomb structure body according to claim 13, wherein said firing is performed within the temperature range from 1500 to 2000° C.

24. The production method of a honeycomb structure body according to claim 13, wherein in said firing, the annealing process for crystallization, which process allows the maintenance at 15000° C. or below, is arranged subsequently to the maintenance at a maximum firing temperature.

25. The honeycomb structure body according to claim 1, wherein said one or more kinds of elements selected from the group consisting of rare earth elements, alkaline earth elements, Al, and Si are yttrium and Al.

26. The honeycomb structure body according to claim 1, wherein said crystal is a compound oxide of yttria and alumina.

27. The production method of a honeycomb structure body according to claim 13, wherein said one or more kinds of elements selected from the group consisting of rare earth elements, alkaline earth elements, Al, and Si are yttrium and Al.

28. The production method of a honeycomb structure body according to claim 13, wherein said crystal is a compound oxide of yttria and alumina.

\* \* \* \* \*